United States Patent
Han et al.

(10) Patent No.: US 10,142,035 B2
(45) Date of Patent: Nov. 27, 2018

(54) INFORMATION TRANSMISSION METHOD, APPARATUS AND SYSTEM

(71) Applicant: TENCENT TECHNOLOGY (SHENZHEN) COMPANY LIMITED, Shenzhen, Guangdong (CN)

(72) Inventors: Lian Han, Shenzhen (CN); Gang Wang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 179 days.

(21) Appl. No.: 15/168,387

(22) Filed: May 31, 2016

(65) Prior Publication Data

US 2016/0277125 A1    Sep. 22, 2016

Related U.S. Application Data

(63) Continuation of application No. PCT/CN2015/071523, filed on Jan. 26, 2015.

(30) Foreign Application Priority Data

Jan. 27, 2014  (CN) .......................... 2014 1 0041008

(51) Int. Cl.
  *H03M 7/34* (2006.01)
  *H04B 11/00* (2006.01)
(52) U.S. Cl.
  CPC .................................. *H04B 11/00* (2013.01)
(58) Field of Classification Search
  CPC ...................................................... H04B 11/00

USPC ..................................................... 341/50–70
See application file for complete search history.

(56) References Cited

U.S. PATENT DOCUMENTS

| 4,250,352 | A | * | 2/1981 | Workman, Sr. | ........ H04M 11/04 379/37 |
| 5,655,152 | A | * | 8/1997 | Ohnishi | .................. H04L 63/08 710/36 |
| 5,905,248 | A | * | 5/1999 | Russell | ............. G06F 17/30879 235/462.15 |
| 6,018,760 | A | * | 1/2000 | Oishi | ..................... G06Q 10/10 709/203 |

(Continued)

FOREIGN PATENT DOCUMENTS

| CN | 1829363 A | 9/2006 |
| CN | 101272554 A | 9/2008 |

(Continued)

OTHER PUBLICATIONS

International Search Report for Application No. PCT/CN2015/071523 dated Jul. 1, 2015.

(Continued)

*Primary Examiner* — Lam T Mai
(74) *Attorney, Agent, or Firm* — Harness, Dickey & Pierce, P.L.C.

(57) ABSTRACT

An information transmission method, apparatus and system, which relate to the field of terminal information interaction provides a cross-terminal information transmission manner that does not need a wireless data link, and is reliable and secure. A first terminal transfers information through vibration and a second terminal obtains, by detecting the vibration, the information transferred by the first terminal.

20 Claims, 4 Drawing Sheets

(56) References Cited

U.S. PATENT DOCUMENTS

| | | | | | |
|---|---|---|---|---|---|
| 6,130,880 | A | * | 10/2000 | Naudus | H04L 29/06 370/235 |
| 6,131,170 | A | * | 10/2000 | Oishi | G06Q 10/10 709/207 |
| 6,229,825 | B1 | * | 5/2001 | Nitta | H04L 12/1813 370/498 |
| 2006/0199601 | A1 | | 9/2006 | Cho | |
| 2011/0169908 | A1 | | 7/2011 | Lee et al. | |

FOREIGN PATENT DOCUMENTS

| | | | |
|---|---|---|---|
| CN | 101383663 | A | 3/2009 |
| CN | 102204225 | A | 9/2011 |
| CN | 103218164 | A | 7/2013 |
| CN | 103402275 | A | 11/2013 |
| CN | 104104779 | A | 10/2014 |

OTHER PUBLICATIONS

International Preliminary Report for Application No. PCT/CN2015/071523 dated Aug. 2, 2016.
Chinese Office Action for App. No. 2014100410082 dated Nov. 4, 2016, and an English concise explanation of relevance thereof.
Chinese Office Action for Application No. 2014100410082 dated May 22, 2017, and an English concise explanation of relevance thereof.

* cited by examiner

10,142,035 B2

INFORMATION TRANSMISSION METHOD, APPARATUS AND SYSTEM

CROSS-REFERENCE TO RELATED APPLICATIONS

This application is continuation of International Application No. PCT/CN2015/071523, filed Jan. 26, 2015. This application claims the benefit and priority of Chinese Application No. 201410041008.2, filed Jan. 27, 2014. The entire disclosures of each of the above applications are incorporated herein by reference.

FIELD

The present disclosure relates to the field of information transmission and to an information transmission method, apparatus and system.

BACKGROUND

This section provides background information related to the present disclosure which is not necessarily prior art.

According to the categorization of information transfer media, existing cross-terminal information transfer methods are mainly classified into two types: transfer through a wireless network and transfer through sound waves.

In the cross-terminal information transfer through a wireless network, information is transferred by means of a data service provided by a telecom operator or transferred through a wireless local area network (WLAN). The defect of this transfer manner is that it needs the support of a wireless data link; otherwise, information cannot be transferred. Therefore, this transfer method is highly limited.

In the cross-terminal information transfer through sound waves, one terminal plays a sound that is encoded in a special manner and is audible to human ears, and another terminal receives a sound signal by using a microphone and performs digital decoding on the received sound signal to obtain related information. The defect of this transfer method lies in that it needs a quiet environment; otherwise, the transfer failure rate is high. Moreover, because the propagation direction of sound is difficult to control, information transferred may be received by a third party, which is insecure.

SUMMARY

This section provides a general summary of the disclosure, and is not a comprehensive disclosure of its full scope or all of its features.

Various embodiments of the present disclosure provide an information transmission method, apparatus and system, so as to provide a cross-terminal information transmission method that does not need a wireless data link and is highly reliable and secure.

Various embodiments of the present disclosure provide an information transfer method, where the method includes:

acquiring, by a first terminal, to-be-transmitted information;

encoding, by the first terminal, the to-be-transmitted information at least once by using a preset encoding mode to obtain vibration code information and determining, according to a reset rule, a vibration rhythm corresponding to the vibration code information; and vibrating, by the first terminal according to the vibration rhythm, so as to transfer the to-be-transmitted information to another terminal.

Various embodiments of the present disclosure provide an information receiving method, where the method includes:

detecting, by a second terminal, a vibration rhythm of a first terminal and determining, according to a preset rule, vibration code information corresponding to the detected vibration rhythm; and decoding, by the second terminal, the vibration code information at least once by using a preset decoding mode to obtain information transferred by the first terminal through vibration.

Various embodiments of the present disclosure provide an information transfer terminal, where the terminal includes:

an acquiring unit, configured to acquire to-be-transmitted information;

an encoding unit, configured to encode the to-be-transmitted information at least once by using a preset encoding mode to obtain vibration code information; and a vibration unit, configured to determine, according to a preset rule, a vibration rhythm corresponding to the vibration code information and vibrate according to the determined vibration rhythm, so as to transfer the to-be-transmitted information to another terminal.

According to various embodiments, the encoding unit is configured to:

encode the to-be-transmitted information by using a first encoding method to obtain coded information; and encode the coded information by using a second encoding method to obtain the vibration code information.

Various embodiments of the present disclosure provide an information receiving terminal, where the terminal includes:

a detection unit, configured to detect a vibration rhythm of another terminal, and determine, according to a preset rule, vibration code information corresponding to the detected vibration rhythm; and a decoding unit, configured to decode the vibration code information at least once by using a preset decoding mode to obtain information transferred by the another terminal through vibration.

Various embodiments of the present disclosure provide an information transmission system, where the system includes the information transfer terminal and the information receiving terminal.

In the methods provided by the embodiments of the present disclosure, a first terminal acquires to-be-transmitted information, encodes the to-be-transmitted information at least once by using a preset encoding mode to obtain vibration code information, determines, according to a preset rule, a vibration rhythm corresponding to the vibration code information, and vibrates according to the determined vibration rhythm, so as to transfer the to-be-transmitted information to another terminal. A second terminal detects a vibration rhythm of the first terminal, determines, according a preset rule, vibration code information corresponding to the vibration rhythm, and decodes the vibration code information at least once by using a preset decoding mode to obtain the information transferred by the first terminal through vibration. It can be seen that, in the present disclosure, a first terminal transfers information through vibration and a second terminal obtains, by detecting the vibration, the information transferred by the first terminal. This information transfer manner does not need a wireless data link, is not affected by network environment noise and the like, and is highly reliable. Moreover, it is almost impossible for a third party to receive information transferred in this manner, and therefore, this information transfer manner is highly secure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To illustrate the technical methods in the embodiments of the present disclosure more clearly, the following briefly introduces the accompanying drawings to illustrate the embodiments of the present disclosure. The drawings described in the following description show merely some embodiments of the present disclosure, and one with ordinary skill in the art may still derive other drawings from these drawings without creative efforts.

Corresponding reference numerals indicate corresponding parts throughout the several views of the drawings.

DETAILED DESCRIPTION

Example embodiments will now be described more fully with reference to the accompanying drawings.

To make the goals, technical methods, and benefits of the present disclosure clearer, the implementation methods of the present disclosure will be described in more detail below with reference to the accompanying drawings.

In the embodiments of the present disclosure, in order to provide a cross-terminal information transmission method that does not need a wireless data link and is highly reliable and secure, a first terminal transfers information through vibration and a second terminal detects the vibration to obtain the information transferred by the first terminal.

Figure 1:
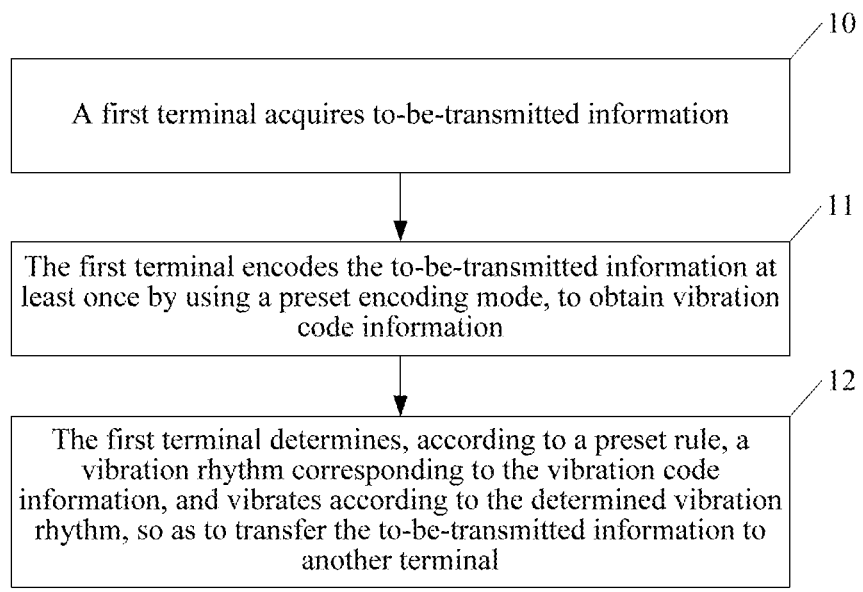
FIG. 1 is a flowchart of an information transfer method according to various embodiments of the present disclosure.

According to various embodiments of the present disclosure, FIG. 1 provides an information transfer method for a party that transfers information, where the method includes the following blocks.

Block 10: A first terminal acquires to-be-transmitted information.

Block 11: The first terminal encodes the to-be-transmitted information at least once by using a preset encoding mode to obtain vibration code information.

Block 12: The first terminal determines, according to a preset rule, a vibration rhythm corresponding to the vibration code information and vibrates according to the determined vibration rhythm, so as to transfer the to-be-transmitted information to another terminal.

Block 10, in which a first terminal acquires to-be-transmitted information, may be implemented through one of the following approaches.

First, the first terminal acquires information that needs to be shared and is input or selected by a user and uses the acquired information as the to-be-transmitted information. For example, the first terminal acquires information that is input by the user by using an application module, or currently displayed information selected by the user, and uses the acquired information as the to-be-transmitted information. Herein, an information sharing button may be added in advance in the application module, and after the user inputs or selects information that needs to be shared and taps the information sharing button, the first terminal reads the information that needs to be shared and is input or selected by the user, and performs the subsequent encoding and vibration operations. The information that needs to be shared includes at least one type of information such as file, picture, and video.

Second, the first terminal acquires a download address that is specified by a user or preset, downloads information according to the download address, and uses the downloaded information as the to-be-transmitted information. For example, after the user taps a given download address to download information, the first terminal generates prompt information to prompt the user whether to share the downloaded information. After the user determines that the downloaded information needs to be shared, the first terminal acquires the downloaded information and performs the subsequent encoding and vibration operations. The downloaded information includes at least one type of information, such as file, picture, and video.

Block 11 in which the first terminal encodes the to-be-transmitted information at least once by using a preset encoding mode, may implement obtaining vibration code information as follows: the first terminal encodes the to-be-transmitted information by using a first encoding method to obtain coded information and the first terminal then encodes the coded information by using a second encoding method to obtain the vibration code information.

According to various embodiments, the first encoding method is an encoding method in which coded information obtained after encoding is an English character set and the second encoding method is an encoding method capable of encoding the English character set to obtain the vibration code information. For example, the first encoding method may be a Base64 encoding method. The second encoding method is Morse encoding, and correspondingly, the vibration code information is a Morse alphabet.

Base64 is one of the most common encoding modes used for transmitting 8-bit byte code, and for details, refer to the description of Request For Comments (RFC) 2045-RFC2049. In other application programs, binary data also needs to be encoded into a form that is suitable to be put in a URL (including a hidden form field). In this case, the Base64 code is not only simple and short but also unreadable, that is, the encoded data will not be directly seen by the naked eye of others.

The Morse alphabet consists of two types of information elements, namely, dots (.) and dashes (-). One dot is a basic signal unit and the length of one dash is equal to the time duration of three dots. In one letter or number, dots and dashes are separated by a space of the time duration of two dots. A space between a letter (number) and another letter (number) is the time duration of seven dots. The Morse alphabet plays an important role in early radio communications, and is well known in the field of radio communications. Because the Morse alphabet occupies the least bandwidth and combines technical and artistic features, it is widely applied in real life. The Morse alphabet consists of two types of basic signals and different time intervals: short dot signals ".", read "Di", and long signals "-" that maintain a given period of time, read "Da".

The first encoding method is not limited to the Base64 encoding method and the second encoding method is not limited to the Morse encoding method. On the premise that coded information obtained after encoding by using the first encoding method can be used as source code for encoding of the second encoding method, and a correspondence is set in advance between information obtained after encoding by using the second encoding method and the vibration rhythm, any encoding method falls within the protection scope of the present disclosure.

Encoding methods used as the first encoding method and the second encoding method may be set in advance and may also be selected by the user. That is, the first terminal may send prompt information for selecting an encoding method and provide a list of encoding methods and then determine, according to the selection of the user, which encoding methods are used as the first encoding method and the second encoding method.

It should be noted that, the number of times the encoding is performed by the first terminal on the to-be-transmitted information in block 11 may not be limited to two, and may be three or more.

Block 12, in which the first terminal determines, according to a preset rule, a vibration rhythm corresponding to the vibration code information and vibrates according to the determined vibration rhythm, may be implemented as follows:

The first terminal sequentially reads each information element in the vibration code information. Each time an information element is read, the first terminal determines, according to the preset rule, vibration duration corresponding to the currently read information element, and vibrates according to the vibration duration. The whole first terminal may vibrate, for example, a vibration motor in the first terminal vibrates, and the vibration of the vibration motor drives the whole first terminal to vibrate. For example, after the first terminal encodes the to-be-transmitted information by using the Base64 encoding method and then encodes, by using the Morse encoding method, information obtained by means of Base64 encoding to obtain a Morse alphabet, for an information element "." in the Morse alphabet, the vibration motor vibrates for 1 second. For an information element "-" in the Morse alphabet, the vibration motor vibrates for 3 seconds.

When the first terminal vibrates, apart from the overall vibration, it is also possible that a part of the first terminal vibrates. For example, a vibration module is disposed on an external surface of the first terminal and, after the vibration rhythm corresponding to the vibration code information is determined in block 12, the vibration module vibrates according to the vibration rhythm.

Figure 2:
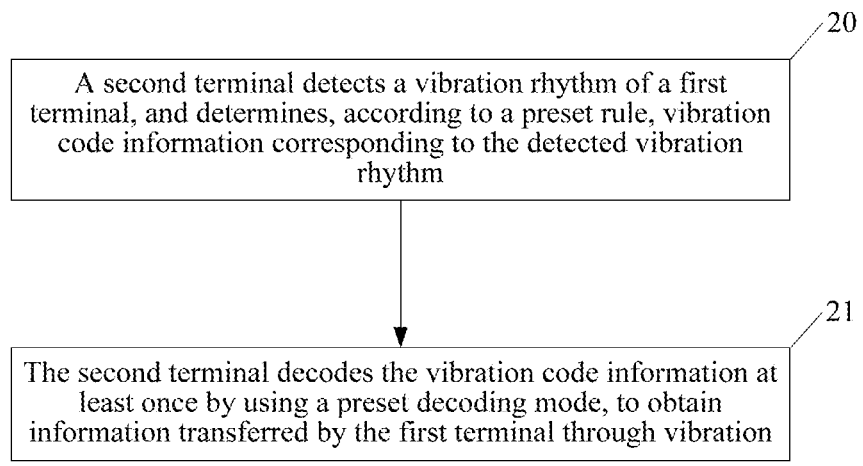
FIG. 2 is a flowchart of an information receiving method according to various embodiments.

Referring to FIG. 2, various embodiments of the present disclosure provide an information receiving method for an information receiver, where the method includes the following blocks.

Block 20: A second terminal detects a vibration rhythm of a first terminal and determines, according to a preset rule, vibration code information corresponding to the detected vibration rhythm.

Block 21: The second terminal decodes the vibration code information at least once by using a preset decoding mode to obtain information transferred by the first terminal through vibration. Block 21, in which the second terminal decodes the vibration code information at least once by using a preset decoding mode to obtain information transferred by the first terminal through vibration. may be implemented as follows:

The second terminal decodes the obtained vibration code information by using a first decoding method to obtain decoded information and the second terminal then decodes the obtained decoded information by using a second decoding method to obtain the information transferred by the first terminal through vibration.

According to various embodiments, the first decoding method is a decoding method capable of decoding the vibration code information into an English character set and the second decoding method is a decoding method capable of decoding the English character set. For example, the vibration code information is a Morse alphabet and, correspondingly, the first decoding method is a Morse decoding method. The second decoding method is a Base64 decoding method.

The first decoding method is not limited to the Morse decoding method and the second decoding method is not limited to the Base64 decoding method. As long as it is ensured that the first decoding method is a decoding method corresponding to the second encoding method and the second decoding method is a decoding method corresponding to the first encoding method, any other decoding methods all fall within the protection scope of the present disclosure.

It should be noted that, the decoding method used when the second terminal decodes the vibration code information needs to correspond to the encoding method used when the first terminal encodes the to-be-transmitted information. That is, the information that the second terminal obtains by decoding the vibration code information using the decoding mode is the same as the to-be-transmitted information before the first terminal encodes the to-be-transmitted information.

Block 20: The second terminal may detect, after contacting the first terminal and vibrating with vibration of the first terminal, a vibration rhythm of the vibration, and determine, according to the preset rule, vibration code information corresponding to the detected vibration rhythm, which may be implemented as follows:

The second terminal acquires acceleration data that is obtained by an acceleration sensor in the second terminal by sensing the vibration of the terminal, obtaining, according to the acceleration data and the preset rule, an information element corresponding to each vibration, and splices the obtained information elements in sequence to obtain the vibration code information. For example, if the first terminal uses the Morse encoding method. When the acceleration sensor in the second terminal detects a vibration of which the vibration duration is 1 second, it is determined that an information element corresponding to the current vibration is ".". When the acceleration sensor detects a vibration of which the vibration duration is 3 seconds, it is determined that an information element corresponding to the current vibration is "-". A Morse alphabet is obtained after the obtained information elements are spliced in sequence. The acceleration sensor is a common but important device or apparatus that senses the acceleration of an object and converts the acceleration into a usable signal, namely, acceleration data.

Herein, if the whole first terminal vibrates, the second terminal may contact any position of the first terminal, and if the first terminal vibrates partially, the second terminal contacts a vibrating position of the first terminal. For example, the second terminal contacts a vibration module disposed on an external surface of the first terminal.

In block 20, the second terminal may not be in contact with the first terminal. Instead, the second terminal detects a vibration rhythm of the first terminal and determines, according to the preset rule, vibration code information corresponding to the detected vibration rhythm. For example, the second terminal may be connected to the first terminal through a connection apparatus (for example, a connection line), and the connection apparatus transfers the vibration of the first terminal to the second terminal, so that the second terminal can sense and detect the vibration rhythm of the vibration and then determines, according to the preset rule, the vibration code information corresponding to the detected vibration rhythm. The second terminal acquires acceleration data that is obtained by the acceleration sensor in the second terminal by sensing the vibration, obtains, according to the acceleration data and the preset rule, an information element corresponding to each vibration, and splices the obtained information elements in sequence to obtain the vibration code information. As another example, if the second terminal is not connected to the first terminal, the vibration of the first terminal drives an object in contact with the first terminal (such as a panel that carries the first terminal) to vibrate and, at the same time, the second terminal in contact with the object vibrates as being driven by the object so that the second terminal can sense and detect the vibration rhythm of the vibration and then determine, according to the preset rule, the vibration code information corresponding to the detected vibration rhythm.

Figure 3:
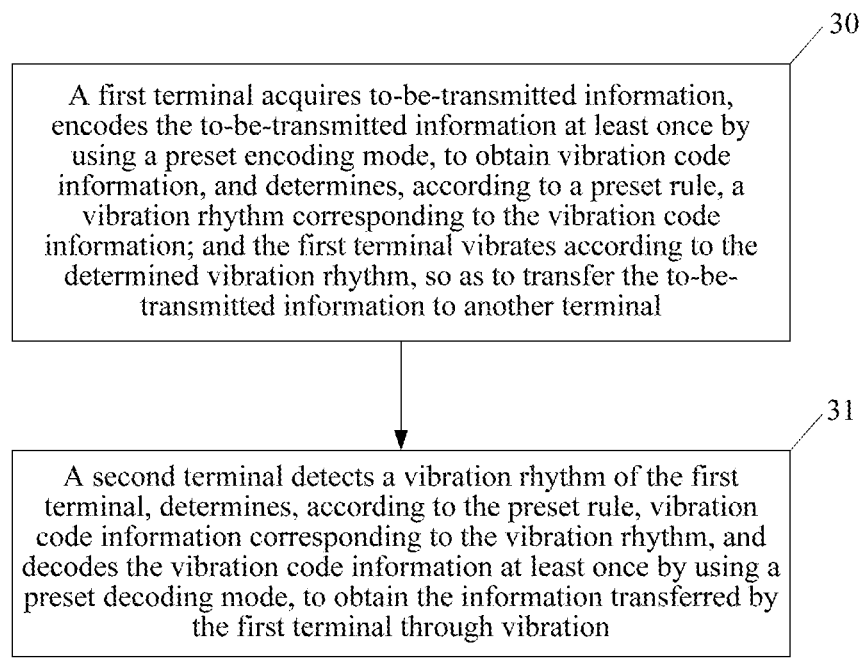
FIG. 3 is a flowchart of an information transmission method according to various embodiments.

According to various embodiments of the present disclosure, FIG. 3 provides an information transfer method for a party that transfers information and a party that receives the information, where the method includes the following.

Block 30: A first terminal acquires to-be-transmitted information, encodes the to-be-transmitted information at least once by using a preset encoding mode to obtain vibration code information, and determines, according to a preset rule, a vibration rhythm corresponding to the vibration code information. The first terminal vibrates according to the determined vibration rhythm, so as to transfer the to-be-transmitted information to another terminal. For description of this block, reference may be made to the description of block 10 through block 12, and details are not described herein again.

Block 31: A second terminal detects a vibration rhythm of the first terminal, determines, according to the preset rule, vibration code information corresponding to the vibration rhythm, and decodes the vibration code information at least once by using a preset decoding mode to obtain the information transferred by the first terminal through vibration. For description of this block, reference may be made to the description of block 20 through block 21, and details are not described herein again.

Figure 4:
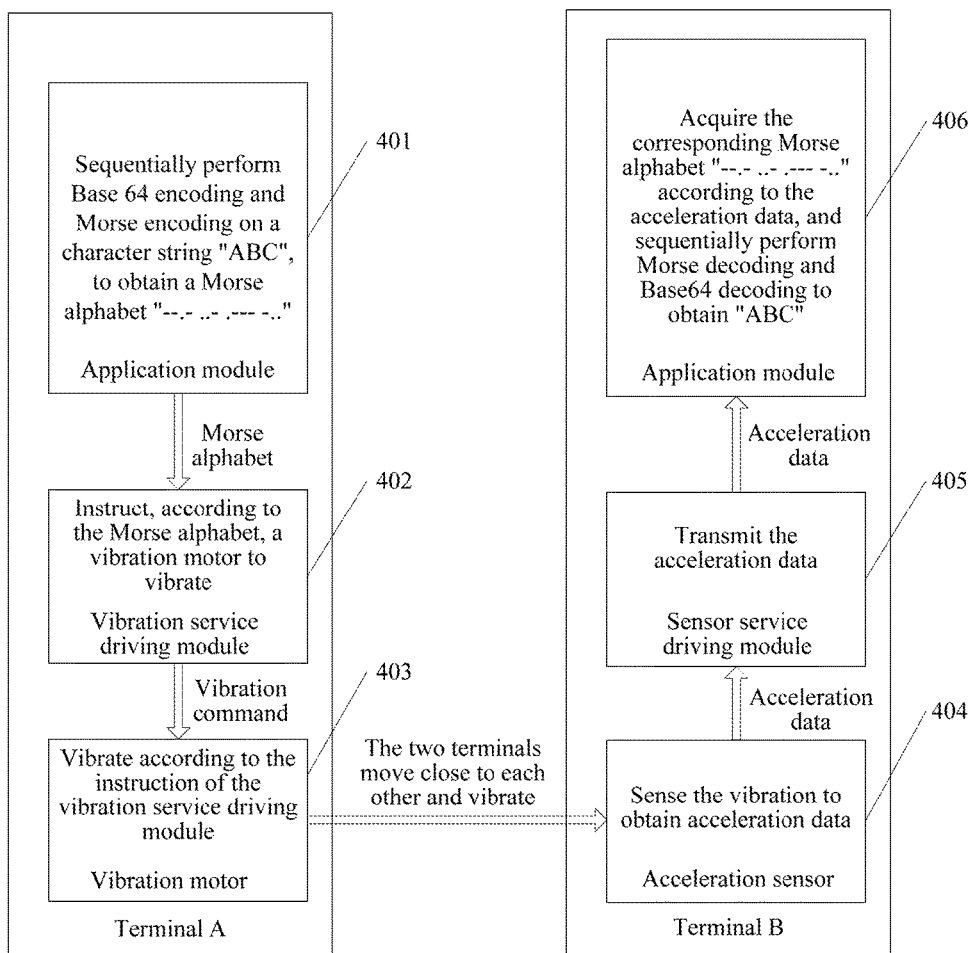
FIG. 4 is an flowchart of information transmission according to various embodiments.

According to various embodiments of the present disclosure, terminal A performs Base64 encoding and Morse encoding on characters of to-be-transmitted information and a vibration service is then invoked, so that a vibration motor vibrates according to a Morse alphabet after the encoding. Terminal B contacts terminal A, so that after terminal B can vibrate with the vibration of terminal A, an acceleration sensor of terminal B is enabled. The acceleration sensor then detects vibration duration on terminal B to obtain a corresponding Morse alphabet and terminal B performs Base64 decoding on the obtained Morse alphabet, so as to obtain the information transferred by terminal A, thereby implementing transfer of the information from terminal A to terminal B. The entire process is shown in FIG. 4.

Block 401: An application module in terminal A acquires to-be-transmitted information, where it is assumed that the to-be-transmitted information is a character string "ABC". Terminal A encodes the to-be-transmitted information by using a Base64 encoding method to obtain coded information "QUJD", and performs Morse encoding on the coded information "QUJD" to obtain a Morse alphabet "--.- ..- .--- -..", and terminal A sends the obtained Morse alphabet to a vibration service driving module.

Block 402: The vibration service driving module receives the Morse alphabet, sequentially reads each information element in the Morse alphabet, instructs, after reading ".", a vibration motor to vibrate for 1 second, and instructs, after reading "-", the vibration motor to vibrate for 3 seconds.

Block 403: The vibration motor vibrates according to the instruction of the vibration service driving module.

Block 404: Terminal B contacts terminal A and, after terminal B can vibrate with vibration of terminal A, enables an acceleration sensor of terminal B and the acceleration sensor obtains acceleration data by sensing the vibration of the terminal and outputs the acceleration data, where the acceleration data includes vibration duration of each vibration.

Block 405: A sensor service driving module sends, to an application module, the acceleration data output by the acceleration sensor.

Block 406: The application module obtains the Morse alphabet according to the acceleration data and a preset rule. When vibration duration of a vibration recorded in the acceleration data is 1 second, it is obtained that an information element corresponding to the vibration is ".", and when vibration duration of a vibration is 3 seconds, it is obtained that an information element corresponding to the vibration is "-". The application module obtains the Morse alphabet "--.- ..- .--- -.." after splicing the obtained information elements in sequence, performs Morse decoding on the obtained Morse alphabet to obtain decoded information "QUJD", and then performs Base64 decoding on the decoded information "QUJD" to obtain the information "ABC" that terminal A needs to transfer.

Various embodiments involve two types of encoding. The first is the Base64 encoding, and the Base64 encoding herein is merely a particular encoding method. Other encoding methods may also be used, as long as the to-be-transmitted information can be mapped to an English character set that can be read and written. Therefore, the first encoding method is not necessarily the Base64 encoding method. The second type is encoding by using a Morse encoding method, information obtained after the Base64 encoding. The Morse encoding method encodes information according to the frequency of occurrence of characters and by using a Huffman tree. This encoding method can ensure a shortest sending time of information in most cases. If this encoding method is not used, information transfer can also be implemented by defining a set of encoding rules and performing decoding according to the self-defined rules, but in most cases, compared with the Morse encoding method, it takes longer to transfer information.

Figure 5:
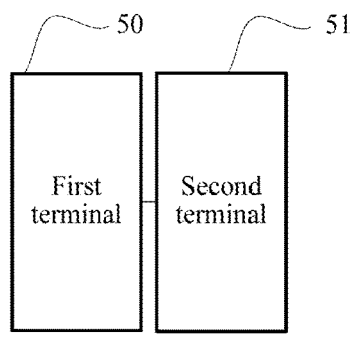
FIG. 5 is a diagram of an information transmission system according to various embodiments.

Referring to FIG. 5, various embodiments of the present disclosure provide an information transmission system, where the system includes the following:

a first terminal 50, configured to acquire to-be-transmitted information, encode the to-be-transmitted information at least once by using a preset encoding mode to obtain vibration code information, and determine, according to a preset rule, a vibration rhythm corresponding to the vibration code information and vibrate according to the determined vibration rhythm, so as to transfer the to-be-transmitted information to another terminal; and a second terminal 51, configured to detect a vibration rhythm of the first terminal, determine, according to the preset rule, vibration code information corresponding to the vibration rhythm, and decode the vibration code information at least once by using a preset decoding mode to obtain the information transferred by the first terminal through vibration.

Further, the first terminal 50 is configured to encode the to-be-transmitted information by using a first encoding method to obtain coded information and encode the coded information by using a second encoding method to obtain the vibration code information. The first encoding method is an encoding method in which coded information obtained after encoding is an English character set and the second encoding method is an encoding method capable of encoding the English character set to obtain the vibration code information. The first encoding method is a Base64 encoding method, the second encoding method is a Morse encoding method, and the vibration code information is a Morse alphabet.

Further, the first terminal 50 is configured to read information elements in the vibration code information sequentially, determine, each time an information element is read, vibration duration corresponding to the currently read information element according to the preset rule, and vibrate according to the vibration duration. The first terminal 50 is configured to acquire information that needs to be shared and is input or selected by a user and use the acquired information as the to-be-transmitted information. The first terminal 50 is configured to acquire a download address that is specified by a user or preset, download information according to the download address, and use the downloaded information as the to-be-transmitted information.

The second terminal 51 is configured to decode the vibration code information by using a first decoding method to obtain decoded information and decode the coded information by using a second decoding method to obtain the information transferred by the first terminal through vibration.

Further, the first decoding method is a decoding method capable of decoding the vibration code information into an English character set and the second decoding method is a decoding method capable of decoding the English character set.

Further, the vibration code information is a Morse alphabet, the first decoding method is a Morse decoding method, and the second decoding method is a Base64 decoding method.

Further, the second terminal 51 is configured to detect, after getting in contact with the first terminal and vibrating with vibration of the first terminal, a vibration rhythm of the vibration and determine, according to the preset rule, vibration code information corresponding to the detected vibration rhythm, or, detect, after being connected to the first terminal through a connection apparatus, a vibration rhythm of the first terminal transferred from the connection apparatus and determine, according to the preset rule, vibration code information corresponding to the detected vibration rhythm.

According to various embodiments, the second terminal 51 is configured to: determine, according to the preset rule, vibration code information corresponding to the detected vibration rhythm according to the method of acquiring acceleration data that is obtained by an acceleration sensor in the second terminal by sensing the vibration of the terminal, obtaining, according to the acceleration data and the preset rule, an information element corresponding to each vibration, and splicing the obtained information elements in sequence to obtain the vibration code information.

Further, the whole first terminal 50 or a part of the first terminal 50 vibrates according to the vibration duration.

Further, the to-be-transmitted information includes at least one of the following types information: file, picture, and video.

Figure 6:
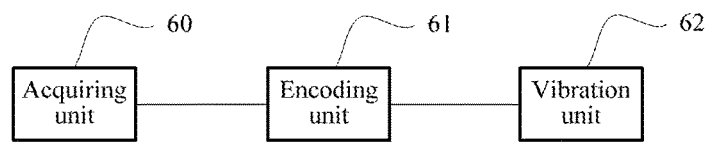
FIG. 6 is a diagram of an information transfer terminal according to various embodiments.

According to various embodiments of the present disclosure, FIG. 6 provides an information transfer terminal, which is applicable to the foregoing information transmission system, where the terminal includes:

an acquiring unit 60, configured to acquire to-be-transmitted information;

an encoding unit 61, configured to encode the to-be-transmitted information at least once by using a preset encoding mode, to obtain vibration code information; and a vibration unit 62, configured to determine, according to a preset rule, a vibration rhythm corresponding to the vibration code information, and vibrate according to the determined vibration rhythm, so as to transfer the to-be-transmitted information to another terminal.

The encoding unit 61 is configured to encode the to-be-transmitted information by using a first encoding method, to obtain coded information and encode the coded information by using a second encoding method to obtain the vibration code information. The first encoding method is an encoding method in which coded information obtained after encoding is an English character set and the second encoding method is an encoding method capable of encoding the English character set to obtain the vibration code information. The first encoding method is a Base64 encoding method, the second encoding method is a Morse encoding method, and the vibration code information is a Morse alphabet. The vibration unit 62 is configured to read information elements in the vibration code information sequentially, determine, each time an information element is read, vibration duration corresponding to the currently read information element according to the preset rule, and vibrate according to the vibration duration. The vibration unit 62 is configured to: trigger the whole current terminal or a part of the current terminal to vibrate according to the vibration duration.

The acquiring unit 60 is configured to acquire information that needs to be shared and is input or selected by a user and use the acquired information as the to-be-transmitted information. The acquiring unit 60 is configured to acquire a download address that is specified by a user or preset, download information according to the download address, and use the downloaded information as the to-be-transmitted information.

Further, the to-be-transmitted information includes at least one of the following types of information: file, picture, and video.

Figure 7:
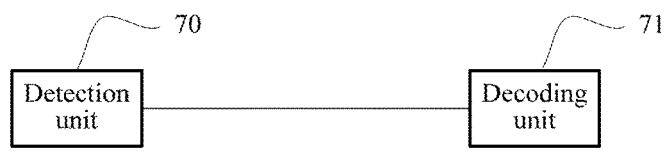
FIG. 7 is a diagram of an information receiving terminal according to various embodiments.

According to various embodiments of the present disclosure, FIG. 7 provides an information receiving terminal, which is applicable to the foregoing information transmission system, where the terminal includes a detection unit 70, configured to detect a vibration rhythm of another terminal, and determine, according to a preset rule, vibration code information corresponding to the detected vibration rhythm and a decoding unit 71, configured to decode the vibration code information at least once by using a preset decoding mode, to obtain information transferred by the another terminal through vibration.

The decoding unit 71 is configured to decode the vibration code information by using a first decoding method, to obtain decoded information and decode the coded information by using a second decoding method to obtain the information transferred by the another terminal through vibration. The first decoding method is a decoding method capable of decoding the vibration code information into an English character set and the second decoding method is a decoding method capable of decoding the English character set. The vibration code information is a Morse alphabet, the first decoding method is a Morse decoding method, and the second decoding method is a Base64 decoding method.

The detection unit 70 is configured to detect, after contacting the another terminal and vibrating with vibration of the another terminal, a vibration rhythm of the vibration and determine, according to the preset rule, vibration code information corresponding to the detected vibration rhythm, or, detect, after being connected to the another terminal through a connection apparatus, a vibration rhythm of the another terminal transferred from the connection apparatus and determine, according to the preset rule, vibration code information corresponding to the detected vibration rhythm.

The detection unit 70 is configured to: determine, according to the preset rule, vibration code information corresponding to the detected vibration rhythm according to the method of acquiring acceleration data that is obtained by an acceleration sensor in the current terminal by sensing the vibration of the terminal, obtaining, according to the acceleration data and the preset rule, an information element corresponding to each vibration, and splicing the obtained information elements in sequence to obtain the vibration code information.

The vibration of the another terminal is the vibration of the whole or a part of the another terminal. The information transferred by the another terminal through vibration includes at least one of the following types of information: file, picture, and video.

Figure 8:
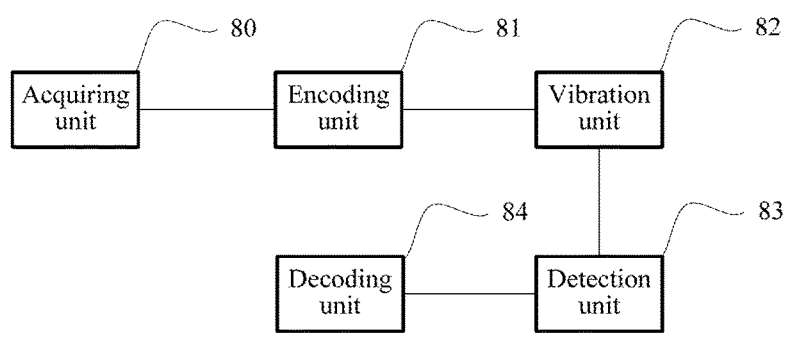
FIG. 8 is a diagram of a terminal according to various embodiments.

According to various embodiments of the present disclosure, FIG. 8 provides an information transmission terminal, where the terminal includes the following.

an acquiring unit 80, configured to acquire to-be-transmitted information;

an encoding unit 81, configured to encode the to-be-transmitted information at least once by using a preset encoding mode to obtain vibration code information;

a vibration unit 82, configured to determine, according to a preset rule, a vibration rhythm corresponding to the vibration code information and vibrate according to the determined vibration rhythm, so as to transfer the to-be-transmitted information to another terminal;

a detection unit 83, configured to detect a vibration rhythm of another terminal and determine, according to a preset rule, vibration code information corresponding to the detected vibration rhythm; and a decoding unit 84, configured to decode the vibration code information, which is determined by the detection unit 83, at least once by using a preset decoding mode to obtain information transferred by the another terminal through vibration.

The acquiring unit 80 is configured to acquire information that needs to be shared and is input or selected by a user, and use the acquired information as the to-be-transmitted information or acquire a download address that is specified by a user or preset, download information according to the download address, and use the downloaded information as the to-be-transmitted information. The encoding unit 81 is configured to encode the to-be-transmitted information by using a first encoding method, to obtain coded information and encode the coded information by using a second encoding method to obtain the vibration code information.

The first encoding method is an encoding method in which coded information obtained after encoding is an English character set and the second encoding method is an encoding method capable of encoding the English character set to obtain the vibration code information. The first encoding method is a Base64 encoding method, the second encoding method is a Morse encoding method, and the vibration code information is a Morse alphabet.

The vibration unit 82 is configured to read information elements in the vibration code information sequentially, determine, each time an information element is read, vibration duration corresponding to the currently read information element according to the preset rule, and vibrate according to the vibration duration. The vibration unit 82 may trigger the whole current terminal or a part of the current terminal to vibrate. The to-be-transmitted information includes at least one of the following types of information: file, picture, and video.

The decoding unit 84 is configured to decode the vibration code information by using a first decoding method to obtain decoded information and decode the coded information by using a second decoding method to obtain the information transferred by the another terminal through vibration. The first decoding method is a decoding method capable of decoding the vibration code information into an English character set and the second decoding method is a decoding method capable of decoding the English character set. The vibration code information is a Morse alphabet, the first decoding method is a Morse decoding method, and the second decoding method is a Base64 decoding method.

The detection unit 83 is configured to detect, after contacting the another terminal and vibrating with vibration of the another terminal, a vibration rhythm of the vibration and determine, according to the preset rule, vibration code information corresponding to the detected vibration rhythm or detect, after being connected to the another terminal through a connection apparatus, a vibration rhythm of the another terminal transferred from the connection apparatus and determine, according to the preset rule, vibration code information corresponding to the detected vibration rhythm.

The detection unit 83 is configured to determine, according to the preset rule, vibration code information corresponding to the detected vibration rhythm according to the method of acquiring acceleration data that is obtained by an acceleration sensor in the current terminal by sensing the vibration of the terminal, obtaining, according to the acceleration data and the preset rule, an information element corresponding to each vibration, and splicing the obtained information elements in sequence to obtain the vibration code information.

The vibration of the another terminal is the vibration of the whole or a part of the another terminal. The information transferred by the another terminal through vibration includes at least one of the following types of information: file, picture, and video.

The terminal in the present disclosure may be a mobile terminal, such as a mobile phone, or a tablet computer.

In conclusion, the present disclosure has various beneficial effects:

In the methods provided by the embodiments of the present disclosure, a first terminal acquires to-be-transmitted information, encodes the to-be-transmitted information at least once by using a preset encoding mode to obtain vibration code information, determines, according to a preset rule, a vibration rhythm corresponding to the vibration code information, and vibrates according to the determined vibration rhythm, so as to transfer the to-be-transmitted information to another terminal. A second terminal detects a vibration rhythm of the first terminal, determines, according a preset rule, vibration code information corresponding to the vibration rhythm, and decodes the vibration code information at least once by using a preset decoding mode to obtain the information transferred by the first terminal through vibration. It can be seen that, in the present disclosure, a first terminal transfers information through vibration and a second terminal obtains, by detecting the vibration, the information transferred by the first terminal. This information transfer manner does not need a wireless data link, is not affected by network environment noise and the like, and is highly reliable. Moreover, it is almost impossible for a third party to receive information transferred in this manner, and therefore, this information transfer manner is highly secure.

The present disclosure is described with reference to the flowchart and/or block diagram of the method, device (system), and computer program product of the embodiments of the present disclosure. It can be understood that computer program instructions implement each process and/or block in the flowchart and/or block diagram and the combination of processes and/or blocks in the flowchart and/or block diagram. These computer program instructions may be provided to a general-purpose computer, a special-purpose computer, an embedded processor, or a processor of another programmable data processing device to produce a machine, so that the instructions executed by using a processor of a computer or another programmable data processing device produce an apparatus for implementing functions specified in one or more processes in the flowchart and/or one or more blocks in the block diagram.

These computer program instructions may also be stored in a computer readable memory capable of instructing a computer or another programmable data processing device to work in a specified mode, so that the instructions stored in the computer readable memory produce a product that includes an instruction apparatus, where the instruction apparatus implements functions specified in one or more processes in the flowchart and/or one or more blocks in the block diagram.

These computer program instructions may also be loaded to a computer or another programmable data processing device, so that the computer or another programmable data processing device executes a series of operation blocks to produce computer implemented processing, so that the instructions executed on the computer or another programmable data processing device provide blocks for implementing functions specified in one or more processes in the flowchart and/or one or more blocks in the block diagram.

Although the exemplary embodiments of the present disclosure have been described, those skilled in the art may make alterations and modifications to these embodiments once they learn the basic inventive concept. Therefore, the appended claims are intended to be construed as including the exemplary embodiments and all alterations and modifications falling within the scope of the present disclosure. The sequence numbers of the above embodiments of the disclosure are only for the purpose of description, and do not represent one embodiment is superior to another.

Those skilled in the art may make various modifications and variations to the present disclosure without departing from the spirit and scope of the present disclosure. If these modifications and variations of the present disclosure belong to the scope of the claims of the present disclosure and equivalent technologies thereof, the present disclosure is also intended to cover these modifications and variations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more blocks within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An information transfer method, applied to a first terminal having one or more processors and a memory for storing program instructions that are executed by the one or more processors, the method comprising:
    acquiring to-be-transmitted information;
    encoding the to-be-transmitted information at least once by using a preset encoding mode, to obtain vibration code information; and
    determining, according to a preset rule, a vibration rhythm corresponding to the vibration code information, and causing the first terminal to vibrate according to the determined vibration rhythm, so as to transfer the to-be-transmitted information to a second terminal.

2. The method according to claim 1, wherein the encoding the to-be-transmitted information at least once by using a preset encoding mode, to obtain vibration code information specifically comprises:
    encoding the to-be-transmitted information by using a first encoding method, to obtain coded information; and
    encoding the coded information by using a second encoding method, to obtain the vibration code information.

3. The method according to claim 2, wherein the first encoding method is an encoding method in which coded information obtained after encoding is an English character set, and the second encoding method is an encoding method capable of encoding the English character set to obtain the vibration code information.

4. The method according to claim 3, wherein the first encoding method is a Base64 encoding method, the second encoding method is a Morse encoding method, and the vibration code information is a Morse alphabet.

5. The method according to claim 1, wherein the determining comprises reading information elements in the vibration code information sequentially, determining, each time an information element is read, vibration duration corresponding to the currently read information element according to the preset rule, and causing the first terminal to vibrate according to the vibration duration.

6. The method according to claim 5, wherein the causing the first terminal to vibrate according to the vibration duration comprises vibrating, by the whole first terminal or a part of the first terminal according to the vibration duration.

7. The method according to claim 1, wherein the acquiring to-be-transmitted information comprises:
acquiring, by the first terminal, information that needs to be shared and is input or selected by a user, and using the acquired information as the to-be-transmitted information.

8. The method according to claim 1, wherein the acquiring to-be-transmitted information comprises:
acquiring, by the first terminal, a download address that is specified by a user or preset, downloading information according to the download address, and using the downloaded information as the to-be-transmitted information.

9. The method according to claim 7, wherein the to-be-transmitted information comprises at least one type of the following information: file, picture, and video.

10. An information receiving method, applied to a second terminal having one or more processors and a memory for storing program instructions that are executed by the one or more processors, the method comprising:
detecting a vibration rhythm of a first terminal, and determining, according to a preset rule, vibration code information corresponding to the detected vibration rhythm; and
decoding the vibration code information at least once by using a preset decoding mode, to obtain information transferred by the first terminal through vibration.

11. The method according to claim 10, wherein the decoding the vibration code information at least once by using a preset decoding mode, to obtain information transferred by the first terminal through vibration specifically comprises:
decoding the vibration code information by using a first decoding method, to obtain decoded information; and
decoding the decoded information by using a second decoding method, to obtain the information transferred by the first terminal through vibration.

12. The method according to claim 11, wherein the first decoding method is a decoding method capable of decoding the vibration code information into an English character set, and the second decoding method is a decoding method capable of decoding the English character set.

13. The method according to claim 12, wherein the vibration code information is a Morse alphabet, the first decoding method is a Morse decoding method, and the second decoding method is a Base64 decoding method.

14. The method according to claim 10, wherein the detecting a vibration rhythm of a first terminal, and determining, according to a preset rule, vibration code information corresponding to the detected vibration rhythm comprises:
detecting, after getting in contact with the first terminal and causing the second terminal to vibrate with vibration of the first terminal, a vibration rhythm of vibration of the second terminal, and determining, according to the preset rule, vibration code information corresponding to the detected vibration rhythm; or,
detecting, after being connected to the first terminal through a connection apparatus, a vibration rhythm of the first terminal transferred from the connection apparatus, and determining, according to the preset rule, vibration code information corresponding to the detected vibration rhythm.

15. The method according to claim 14, wherein the determining, according to the preset rule, vibration code information corresponding to the detected vibration rhythm specifically comprises:
acquiring acceleration data that is obtained by an acceleration sensor in the second terminal by sensing the vibration of the second terminal, obtaining, according to the acceleration data and the preset rule, an information element corresponding to each vibration, and splicing the obtained information elements in sequence to obtain the vibration code information.

16. The method according to claim 14, wherein the vibration of the first terminal is vibration of the whole first terminal or a part of the first terminal.

17. The method according to claim 10, wherein the information transferred by the first terminal through vibration comprises at least one type of the following information: file, picture, and video.

18. An information transfer terminal, comprising:
one or more processors; and
a memory;
wherein one or more program modules are stored in the memory and executed by the one or more processors, and the one or more program modules comprise:
an acquiring unit, configured to acquire to-be-transmitted information;
an encoding unit, configured to encode the to-be-transmitted information at least once by using a preset encoding mode, to obtain vibration code information; and
a vibration unit, configured to determine, according to a preset rule, a vibration rhythm corresponding to the vibration code information, and cause a first terminal to vibrate according to the determined vibration rhythm, so as to transfer the to-be-transmitted information to another terminal.

19. The terminal according to claim 18, wherein the encoding unit is specifically configured to:
encode the to-be-transmitted information by using a first encoding method, to obtain coded information; and
encode the coded information by using a second encoding method, to obtain the vibration code information.

20. The terminal according to claim 18, wherein the vibration unit is specifically configured to:
read information elements in the vibration code information sequentially, determine, each time an information element is read, vibration duration corresponding to the currently read information element according to the preset rule, and causes the first terminal to vibrate according to the vibration duration.

* * * * *